(12) United States Patent
Wombles et al.

(10) Patent No.: US 10,280,371 B2
(45) Date of Patent: *May 7, 2019

(54) DISTILLATION OF USED MOTOR OIL WITH DISTILLATE VAPORS

(71) Applicant: Delta Technologies LLC, Lexington, KY (US)

(72) Inventors: Robert H Wombles, Midway, KY (US); Timothy E Laska, Loveland, OH (US); John T Turner, West Chester, OH (US)

(73) Assignee: Delta Technologies LLC, Lexington, KY (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/987,880

(22) Filed: Jan. 5, 2016

(65) Prior Publication Data

US 2016/0130510 A1    May 12, 2016

Related U.S. Application Data

(63) Continuation-in-part of application No. 13/135,861, filed on Jul. 15, 2011, now Pat. No. 9,243,191.

(51) Int. Cl.
| | | |
|---|---|---|
| *C10G 7/00* | (2006.01) | |
| *B01D 3/06* | (2006.01) | |
| *B01D 3/10* | (2006.01) | |
| *B01D 3/14* | (2006.01) | |

(Continued)

(52) U.S. Cl.
CPC ............... *C10G 7/003* (2013.01); *B01D 3/06* (2013.01); *B01D 3/10* (2013.01); *B01D 3/143* (2013.01);

(Continued)

(58) Field of Classification Search
CPC . B01D 3/06; B01D 3/10; B01D 3/143; C10M 175/0033; C10G 7/00;

(Continued)

(56) References Cited

U.S. PATENT DOCUMENTS

| | | |
|---|---|---|
| 1,646,619 A | 10/1927 | Loomis et al. |
| 3,625,881 A | 12/1971 | Chambers et al. |

(Continued)

*Primary Examiner* — Prem C Singh
*Assistant Examiner* — Brandi M Doyle
(74) *Attorney, Agent, or Firm* — Richard D. Stone

(57) ABSTRACT

A process and apparatus for re-refining used lubricating oil (ULO) having thermally unstable additives such as zinc compounds. ULO is mixed with a superheated distillate which may be a recycle stream, an outside stream, or combination, then charged to a vacuum flash or fractionator, to produce an overhead vapor and a residual fraction comprising additives and/or decomposition products thereof. Overhead vapor is condensed to yield a liquid lubricant boiling range product. Superheating may occur in a fired heater, heat exchanger or combination. Mixing of superheated fluid and ULO may occur in a pipe in turbulent flow and/or an in line mixer. Energy efficiency is improved by heat exchanging ULO feed with vapor or liquid product streams. An aromatic rich and thermally stable outside stream such as FCC LCO can be readily superheated. Recovered lubricant boiling range material can be recycled, used as a lube stock or for FCC feed.

20 Claims, 2 Drawing Sheets

(51) Int. Cl.
*C10M 175/00* (2006.01)
*C10G 7/04* (2006.01)
*C10G 7/06* (2006.01)
*C10G 71/00* (2006.01)
*C10G 11/18* (2006.01)

(52) U.S. Cl.
CPC ............... *C10G 7/04* (2013.01); *C10G 7/06* (2013.01); *C10G 11/182* (2013.01); *C10G 71/00* (2013.01); *C10M 175/0033* (2013.01); *C10G 2300/1007* (2013.01); *C10G 2300/1062* (2013.01); *C10G 2300/4081* (2013.01); *C10G 2400/10* (2013.01)

(58) Field of Classification Search
CPC . C10G 7/003; C10G 7/04; C10G 7/06; C10G 71/00; C10G 11/182; C10G 2300/1007; C10G 2300/1062; C10G 2300/4081; C10G 2400/10
See application file for complete search history.

(56) References Cited

U.S. PATENT DOCUMENTS

| | | |
|---|---|---|
| 3,886,062 A | 5/1975 | Peiser et al. |
| 3,923,664 A | 12/1975 | Hindman |
| 4,406,742 A | 9/1983 | Dick |
| 4,432,865 A | 2/1984 | Norman |
| 4,477,356 A | 10/1984 | Grow |
| 4,666,587 A | 5/1987 | Martin |
| 4,941,967 A | 7/1990 | Mannetje et al. |
| 5,244,565 A | 9/1993 | Lankton et al. |
| 5,286,380 A | 2/1994 | Mellen |
| 5,302,282 A | 4/1994 | Kalnes et al. |
| 5,447,628 A * | 9/1995 | Harrison .......... C10M 175/0075 208/179 |
| 5,556,548 A | 9/1996 | Mellen |
| 6,068,759 A | 5/2000 | Moore et al. |
| 6,106,699 A | 8/2000 | MacDonald et al. |
| 6,402,937 B1 * | 6/2002 | Shaffer, Jr. ....... C10M 175/0025 208/179 |
| 6,402,938 B1 * | 6/2002 | Moore ............ C10M 175/0025 208/179 |
| 6,447,672 B1 | 9/2002 | Moore et al. |
| 6,508,916 B1 | 1/2003 | Razzaghi et al. |
| 7,150,822 B1 * | 12/2006 | Malone .................. C10G 31/06 208/179 |
| 7,226,533 B2 | 6/2007 | Angulo Aramburu |
| 7,241,377 B2 | 7/2007 | Malone |
| 7,341,656 B1 * | 3/2008 | Malone .................. C10G 27/04 208/39 |
| 9,243,191 B1 * | 1/2016 | Wombles ................ C10G 7/06 |

\* cited by examiner

DISTILLATION OF USED MOTOR OIL WITH DISTILLATE VAPORS

CROSS REFERENCE TO RELATED APPLICATION

This application is related to our prior co-pending application Ser. No. 13/135,861 filed Jul. 15, 2011 which is incorporated by reference.

FIELD OF THE INVENTION

The invention relates to direct contact heating of normally liquid hydrocarbons and the like especially those which are thermally unstable or difficult to heat e.g. processing used motor oil to recover distillable hydrocarbons. The invention also relates to a way to produce a high quality feed for a catalytic cracking unit by distilling used motor oil.

BACKGROUND OF THE INVENTION

Processing used motor oil has been a problem in search of a solution for over fifty years. It is a problem both in size and technology. In the USA, over one billion gallons of used motor oil is "produced". Little of it is recycled or used effectively and much is improperly dumped. Re-refining is a problem because the very additives which make modern lubricating oils stick to metal surfaces in an engine greatly complicate recovery of the lubricant boiling range hydrocarbons, at least recovery using commercially viable technology. The state of the art of producing, collecting and re-refining of used motor oil and other industrial oils will be reviewed along with some limitations encountered in use of re-refined oil as e.g. a diesel blending component.

Automotive and many industrial lubricating oils are usually formulated from paraffin based petroleum distillate oils or from synthetic base lubricating oils. Lubricating oils are combined with additives such as soaps, extreme pressure (EP) agents, viscosity index (VI) improver, anti-foamants, rust inhibitors, anti-wear agents, antioxidants, and polymeric dispersants to produce an engine lubricating oil of SAE 5 to SAE 60 viscosity.

After use this oil is collected from truck and bus fleets, automobile service stations, and municipal recycling centers for reclaiming. This collected oil contains organo-metallic additives such as zinc dialkylthiophosphate from the original lubricating oil formulation, sludge formed in the engine, and water. The used oil may also contain contaminants such as waste grease, brake fluid, transmission oil, transformer oil, railroad lubricant, crude oil, antifreeze, dry cleaning fluid, degreasing solvents such as trichloroethylene, edible fats and oils, mineral acids, soot, earth and waste of unknown origin.

Reclaiming of waste oil is largely carried out by small processors using various processes tailored to the available waste oil, product demands, and local environmental considerations. Such processes at a minimum include partial de-watering and coarse filtering. Some more sophisticated processors may practice chemical demetallizing or distillation. The presence of organo-metallics in waste oils such as zinc dialkylthiophosphate results in decomposition of the zinc dialkyldithiophosphate to form a carbonaceous layer rich in zinc and often other metals such as calcium, magnesium and other metals present as additives and thus is difficult if not impossible to process. The carbonaceous layer containing the various metals forms rapidly on heated surfaces and can develop to a thickness of more than 1 mm in 24 hours. This layer not only reduces the heat transfer coefficient of tubular heaters rapidly, it also results in substantial or total occlusion of these tubes within a few days.

Successful reclaiming processes require the reduction of the organo-metallics (or ash) content to a level at which the hot oil does not foul heated surfaces. Such reduction can be carried out by chemical processes which include reacting cation phosphate or cation sulfate with the chemically bonded metal to form metallic phosphate or metallic sulfate. U.S. Pat. No. 4,432,865 to Norman, the contents of which are incorporated herein by reference, discloses contacting used motor oil with polyfunctional mineral acid and polyhydroxy compound to react with undesired contaminants to form easily removable reaction products. These chemical processes suffer from attendant disposal problems depending on the metal by-products formed.

Ash content can also be reduced by heating the used lubricating oil (ULO) to decompose the organo-metallic additives. Direct contact heating of ULO with a recycled bottoms fraction was disclosed in U.S. Pat. No. 5,447,628 to Harrison, et al., the contents of which are incorporated herein by reference. The ULO was added to a lower section of a vacuum column with an enlarged bottom section. There was enough volumetric capacity below the first tray of the column to provide "a residence time of 10 to 120 minutes." The EXAMPLE reported that a residence time of 45 minutes and a relatively constant temperature of 660° F. A dehydrated ULO fraction was mixed with a recycled bottoms fraction in the ratio of 1:45. The long residence time and high temperature were believed sufficient to decompose the additives in the ULO so that a bottoms fraction from this column could be sent to a fired heater to supply the heat needs of the process. The patentee reported that additive decomposition began at 400° F. The Figure in the patent showed that zinc compound decomposition was a function of temperature with time temperature decomposition profiles presented for 400° F., 500° F., 750° F. and 1000° F.

UOP's Hy-Lube process described in U.S. Pat. Nos. 5,244,565, 5,302,282, and many more patents uses a hot circulating hydrogen rich stream as a heating medium to avoid deposition of decomposed organo-metallic compounds on heating surfaces.

The problem of fouling of heated surfaces can be ameliorated to some extent by gentler heating. Some processes such as the fixed bed version of catalytic cracking, the Houdry process, used a molten salt bath to provide controlled somewhat gentle heating of vaporized liquid hydrocarbon passing through tubes of catalyst immersed in the salt bath. Molten metal baths have also been used as a convenient way to heat difficult to process substances to a control temperature e.g. flammability of some plastics is tested by putting a flask with plastic into a bath of molten metal. Use of molten salt bath or molten metal bath or condensing high temperature vapor could be used to reduce uneven heating of heat exchange surface and thereby reduce AT across a metal surface and perhaps slow the fouling of metal surfaces in ULO service, but the additives in the ULO would still tend to decompose on the hottest surface which would be the heat exchanger tubes.

In U.S. Pat. Nos. 7,150,822 and 7,241,377, Malone taught use of a molten metal or molten salt bath for direct contact heating of ULO. The process effectively heats ULO without fouling the heating surface, a molten metal or salt bath, but the process requires a large heavy molten metal vessel for processing of the oil. Start-up of such a process or perhaps operation may have encountered problems as the first commercial unit is believed no longer be in operation.

Solvent extraction with light paraffin solvents such as propane, butane, pentane and mixtures thereof have been practiced by Interline and others. Details of the Interline Process are provided in U.S. Pat. Nos. 5,286,380 and 5,556,548. While the extraction approach seems like an elegant solution to the problem of processing ULO, the process may be relatively expensive to operate. Their quarterly report of May 15, 2002, reports that "It has become evident that demanding royalties based on production is impractical in many situations and countries. Unless and until the re-refined oil produced in a plant can be sold at prices comparable to base lubricating oils, collecting royalties based on production will be difficult. This reality was experienced in Korea, where the royalty was terminated for the first plant, and in England where the royalties were reduced and deferred until the plant becomes profitable."

Another approach to ULO processing was direct contact heating of the ULO with steam or a non-hydrogenating gas. This solved the problem of zinc additive decomposition fouling of hot metal surfaces by ensuring that the metal surfaces holding the ULO were always relatively cool. The hottest spot in these ULO process was the point of vapor injection. Decomposing additives had only themselves upon which to condense.

A vapor injection ULO process was disclosed in U.S. Pat. No. 6,068,759 Process for Recovering Lube Oil Base Stocks from Used Motor Oil and U.S. Pat. No. 6,447,672 Continuous Plural Stage Heated Vapor Injection Process for Recovering Lube Oil Base Stocks from Used Motor Oil. The heated vapor was steam, methane, ethane, propane or mixtures. Other variations on the theme of ULO vapor injection are disclosed in U.S. Pat. No. 6,402,937 Pumped Recycle Vapor and U.S. Pat. No. 6,402,938, Vaporization of Used Motor Oil with Nonhydrogenating Recycle Vapor, which are incorporated by reference. This approach used a "working fluid" such as methanol or propane which was heated and mixed with ULO to vaporize lube boiling range components. A lube fraction was recovered as a product and the methanol or propane working fluid either compressed or condensed and pumped through a heater to be recycled to heat incoming ULO.

Another concern with existing technology is finding a profitable market for the re-refined ULO. This is of course highly dependent on the method used to recycle the ULO. If coking is used much of the ULO feed ends up as coke, and there is little distillate boiling range material left and it is of poor quality. If extraction and chemical treatment are used, there is a relatively large amount of distillate liquid produced, but the costs are high.

Vacuum distillation of ULO was used by Emerald Services Inc. to produce a material similar to a virgin lube blending stock. Washington State studied this material for use as a ferry fuel with the fuel being a 50/50 blend of recycled lube oil and Ultra Low Sulfur Diesel or ULSD. The Washington State Department of Transportation reported the "re-refined fuel (blend) does not comply with the EPA requirement. The issue is sulfur content. The sulfur content is five times the allowable limit for use in the Emission Control Area (ECA)." Letter of Lynne Griffith, Assistant Secretary, Ferries Division to the Senate Transportation Committee, Dec. 9, 2014. This letter is noted to make the point that some seemingly obvious uses of re-refined ULO as fuel are not options.

Petroleum refiners have been trying for over half a century to devise a satisfactory way to reprocess used lube oil. No process is known which could be considered a commercial success. Despite the abundance of a potentially valuable waste material, namely the lubricating oil boiling range hydrocarbons trapped in the ULO, most ULO is not re-refined. The "state of the art" of used motor oil processing could be summarized as follows:

Chemical additive and extraction approaches can be used to react with or extract everything but zinc additives, but costs associated with such processes are apparently high as evidenced by little commercial use.

Indirect heating in a fired heater causes rapid fouling of metal surfaces. Using milder heating via a double boiler approach or molten metal heating medium can minimize but not eliminate fouling on hot metal surfaces.

Direct contact heating with high pressure hydrogen may eliminate fouling but requires high capital and operating expenses.

Direct contact heating with a recycled bottoms fraction can still suffer from heater fouling. A stream containing the non-distillable additive package and/or the decomposition products thereof is still sent through a fired heater where fouling can occur.

Direct contact heating with steam or a light hydrocarbon "working fluid" vapor is an attractive approach. When steam is the injected vapor, the process can create a water disposal problem and is thermally less efficient because the latent heat of water is lost when the steam is condensed against cooling water or air in a heat exchanger. There are also concerns about possible formation of emulsions or corrosive regions in portions of the plant when water is condensing. When a "working fluid" is used for heating e.g. propane, the water problem is largely eliminated, but large volumes of vapor are needed to provide sufficient heat input so costs increase to heat and recycle such vapor streams. The working fluid approach also calls for a somewhat higher capital cost, because higher pressure operation is generally needed to facilitate circulation of the large volumes of working fluid to heat the used lube oil feed.

We wanted a better approach, one which is simple and reliable and which does little or no harm to the used lube oil fraction. We define harm as thermally cracking the ULO and generating large amounts of reactive intermediate species, many of which contain chlorides.

Brute force heating by recycling a bottoms stream forces at least some of the additive package to end up in the bottoms which go through a fired heater and cause fouling. The brute force approach vaporizes the lubricant boiling range components but can easily degrade the lube components and contaminate them with significant amounts of the breakdown products of the additive package. The recovered lube boiling range components will have significant value as fuel or cracker feed blending component but are generally not suitable for use as lubricant blending stock, at least not without a lot of expensive hydrotreating. Destructive distillation of ULO by spraying it on top of a coker drum decomposes the additive package and leaves it behind in the coke, but the valuable paraffinic lubricant boiling range hydrocarbons are converted to coker naphtha or other reactive and difficult to process fractions. The lube fraction is arguably "recovered" but is no longer remotely suitable for use as a blending component.

Steam injection for heating of ULO would minimize thermal degradation of lubricant boiling range hydrocarbons in the ULO, but the relatively "wet" approach causes concerns about disposal of waste water, emulsion formation and/or plant corrosion. The "pumped vapor" approach using propane or the like eliminates most water problems but requires a more complicated plant to recycle the hydrocarbon vapor. Large molar volumes of injected vapor are needed because of the relatively low molecular weight and low heat capacity of hydrocarbon vapors. Condensation and separation of injected heating vapor and recovered lubricating components are somewhat expensive.

Another limitation of some conventional approaches to re-refining ULO which use vaporization is the residue. When ULO is vaporized, the vapors are generally high quality material which are easy to deal with although frequently contaminated by degradation of the additive package. Even when a gentle enough heating method is used e.g. WFE and a hard vacuum, a significant amount of the ULO must be left behind in the residue fraction to make it pumpable. We want to recover the valuable lube boiling range components, but wanted to minimize the amount of residue while still leaving the residue liquid enough to pump. In practice usually 20 LV % or more of the ULO was left behind in the residue package.

We wanted to vaporize the valuable lube components and/or the readily crackable components in ULO. When use of recovered lubricant boiling range fractions as a lubricant blending stock was contemplated, it was important to recover this fraction without unduly damaging it. When used lube oil was to be "recycled" by feeding it to a catalytic cracking unit, it was not so important to prevent thermal cracking of the recovered lubricant boiling range fraction, but it was essential to do so without fouling the plant heaters used to vaporize the used lube oil. We realized that there was a way to overcome the deficiencies of the prior art process by doing something akin to early treatment of FCC feed. In the FCC process, refiners charge a selected distilled fraction to the cracking unit. A distilled feed is used because distillation leaves behind unwanted metal species which are a poison to the cracking catalyst. Our approach was something like an island hopping campaign in war. We did not care about eliminating the enemy, namely the additive package, if we could get around it.

We found that a superheated distillate boiling range material was the ideal material to use to heat and vaporize the used lubrication oil. The superheated distillate could be recovered from an effluent of the used lube oil refining process. It was also possible, and would be preferred in some instances to use a distillate boiling range material which had never been used as a lubricant fraction. In many cases the ideal superheated distillate boiling range material would be a cat cracker feedstock which was too aromatic to be an ideal FCC charge material. Refiners have known for decades that aromatic material is hard to crack, and they try to limit the amount of aromatics in the fresh feed to the unit and also try to limit the amount of aromatic rich material recycled within the FCC unit. These aromatic materials were hard to process in the FCC unit because the aromatics were very thermally stable. This property—thermal stability—makes aromatic rich materials ideal for use as a superheated fluid for vaporizing used motor oil. When aromatic rich liquids such as a cycle oil or slurry oil from an FCC unit are used for ULO re-refining, the resulting product is somewhat less desirable as a cracker feed because of the high aromatic content. The multi-ring aromatics typically in such FCC streams do not become easier to crack because of the presence of significant amounts of aliphatic lube components, but the mixture still has significant value as cracker feed stock.

There are benefits and burdens associated with different distillates. A recycled recovered lube oil fraction will always be available from a ULO recycling plant so no outside source of feed is required. The only drawback to use of this material is that the highly paraffinic lube stock is readily cracked both thermally and catalytically. When the process is optimized to produce a lube blending stock from ULO, it will usually be desirable to gently heat the recycled lube fraction to avoid thermal cracking. When the process is run to make cracker feed or some other fuel oil product, there is less concern about high temperature in the furnace used to make the superheated fluid so higher temperatures can be tolerated even if there is some thermal cracking.

The key feature is heating the ULO with a superheated distillate vapor. This material can be a recycled product fraction, a portion of the lubricant boiling range product recovered from the used lube oil fractionator. This material is essentially free of metals and could safely be heated in a heat exchanger or fired heater without fear of fouling. This fraction is always available downstream of the re-refining plant. It has a high boiling point which is essentially the same as the boiling point of the lubricating oil components of the ULO feed to the process. This vaporized lube fraction could be readily condensed at high temperature. It also by virtue of its high molecular weight carries a lot of energy with it when heated in a furnace or heat exchanger so that undue volumetric amounts were not required to achieve the desired amount of direct contact heating of ULO feed. An outside distillate stream can also be used and is preferred in some cases. This requires a source of outside distillate material separate from the ULO feed, but such materials are always available. Preferably the outside distillate materials have been through one or more distillation steps so that relatively clean superheated vapor is used to heat and vaporize lubricant boiling range material from the ULO. The high grade energy in the resulting mix of superheated vapor and vaporized distillate boiling range material may be used to effectively and gently preheat incoming ULO liquid feed for energy savings.

The use of a vaporized distillate boiling range hydrocarbon simplified the process flow and gave the option to achieve significant improvement in thermal efficiency of the process and facilitate plant operation. When a recycle fraction of lubricant boiling range material is used no purchased working fluid is needed save perhaps at initial startup. The vaporized lube fraction condenses readily at elevated temperature, even under vacuum conditions so fin fan coolers or heat exchangers can easily condense these vapors. Preferably much of the energy in the vaporized lube fraction is recovered by heat exchange with ULO feed.

The condensed lubricant boiling range material recovered from the product is a relatively stable material at least far more stable than the feed ULO. This stable material may tolerate a lot of heating by heat exchange with heavy residue material withdrawn from the product fractionator, by heating in a fired heater or by heat exchange with some other high temperature heat source. While the paraffinic lubricant boiling range material is subject to thermal cracking, at least the only cracking products will be those typically experienced during mild thermal cracking of relatively pure hydrocarbons—a modest amount of olefins. Such a stream is a valuable product, especially as a lubricant blending stock. With hydro-processing it can produce a premium lube blending stock or fuel. Such modestly cracked streams with some olefins but few dienes may be processed easily using conventional refinery technology, whereas severely cracked streams with high diene content require extra and expensive processing to make them stable enough for further processing.

When a distillate material not derived from ULO is used as the source of superheated fluid, it must be brought in from outside. Such materials will usually have a significantly higher aromatic content than any lubricant fractions. The outside material may be safely heated by heat exchange with various ULO re-refining plant streams with few concerns about thermal cracking and may also be heated in a conventional furnace or fired heater with greatly reduced concerns about thermal cracking when compared to a more paraffinic lubricant based material.

BRIEF SUMMARY OF THE INVENTION

Accordingly the present invention provides a process for re-refining a used lubricating oil (ULO) containing lubricant boiling range hydrocarbons and a thermally unstable additive package which fouls metal surfaces used to heat said ULO to vaporize said lubricant boiling range hydrocarbons comprising direct contact heating of said ULO with a superheated fluid comprising at least a majority by weight of distillate boiling range hydrocarbons to form a heated mixture of said ULO and said superheated fluid, flashing or fractionating said heated mixture to produce a vapor fraction comprising at least a majority of the lubricant boiling range hydrocarbons in said ULO feed and a residual liquid fraction comprising at least a majority by weight of said thermally unstable additives or the decomposition products thereof, and a minority by weight of said lubricant boiling range hydrocarbons in said ULO feed, plus cooling and condensing at least a portion of said vapor fraction to produce a liquid product comprising lubricant boiling range hydrocarbons recovered from said ULO feed.

In another embodiment the present invention provides a process for re-refining a used lubricating oil (ULO) containing lubricant boiling range hydrocarbons and a thermally unstable additive package which fouls metal surfaces used to heat said ULO to vaporize said lubricant boiling range hydrocarbons to produce at least two liquid products, a distillate boiling range liquid comprising at least 80 wt % of lubricant boiling range molecules in said ULO and a pumpable liquid residue fraction, said process comprising direct contact heating of said ULO with a superheated fluid comprising distillate boiling range hydrocarbons to form a two phase heated mixture of said ULO and said superheated fluid, flashing, fractionating or separating said heated mixture to produce a vapor fraction comprising at least a majority by weight of lubricant boiling range hydrocarbons in said ULO feed and a residual liquid fraction comprising at least a majority by weight of said thermally unstable additives or the decomposition products thereof, said residual liquid fraction containing less than 20 by weight of said lubricant boiling range hydrocarbons in said ULO feed, plus cooling and condensing at least a portion of said vapor fraction to produce a liquid product comprising at least 80 wt % of lubricant boiling range hydrocarbons in said ULO feed.

In yet another embodiment, the invention provides a method of making an aliphatic rich feedstock for a catalytic cracking unit from used lubrication oil (ULO) containing lubricant boiling range hydrocarbons and a thermally unstable additive package which fouls metal surfaces used to heat said ULO to vaporize said lubricant boiling range hydrocarbons by heating and vaporizing said ULO by direct contact heating with an aromatic rich superheated fluid to produce a liquid product comprising at least 80 wt % of said lubricant boiling range hydrocarbons in said ULO and a pumpable residual liquid fraction comprising at least a majority by weight of said thermally unstable additives or the decomposition products thereof and containing less than 20% by weight of said lubricant boiling range hydrocarbons in said ULO feed, said process comprising direct contact heating of said ULO with a superheated fluid comprising gas oil, vacuum gas oil, FCC light cycle oil, FCC heavy cycle oil, FCC slurry oil to form a two phase heated mixture of said ULO and said superheated fluid, flashing, fractionating or separating said heated mixture to produce a vapor fraction comprising at least 80% by weight of lubricant boiling range hydrocarbons in said ULO feed and a pumpable residual liquid fraction comprising at least a majority by weight of said thermally unstable additives or the decomposition products thereof, said residual liquid fraction containing less than 20% by weight of said lubricant boiling range hydrocarbons in said ULO feed, and cooling and condensing at least a portion of said vapor fraction to produce a liquid product comprising at least 80 wt % of lubricant boiling range hydrocarbons in said ULO feed.

The invention will be more fully understood from the following description of the preferred embodiment taken in conjunction with the figures.

DETAILED DESCRIPTION OF PREFERRED EMBODIMENTS

Figure 1:
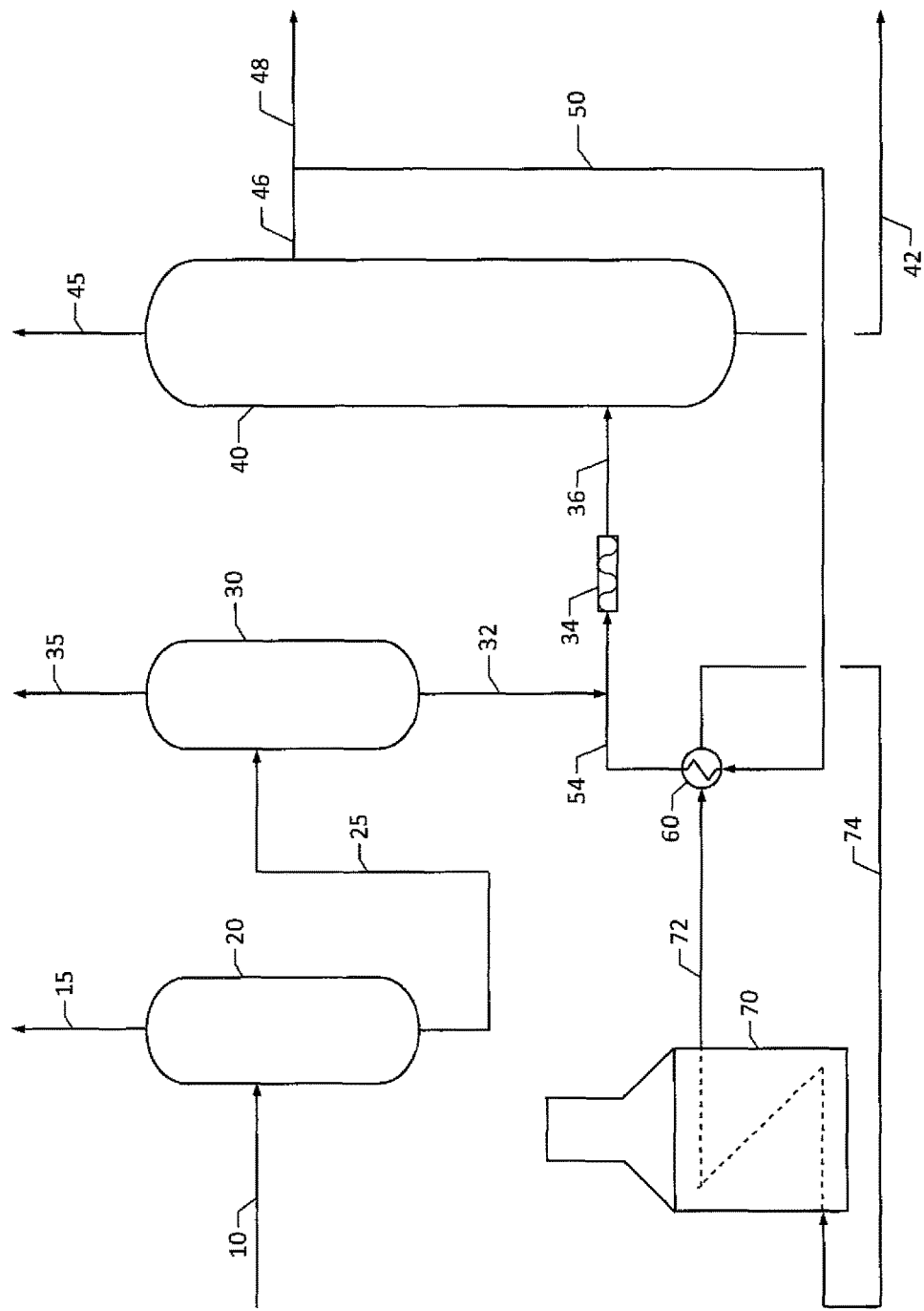
FIG. 1 is a simplified schematic drawing of an embodiment wherein used oil is heated by direct contact heating with a heated, recycle, vapor stream derived from the used oil feed.

As used herein distillate boiling range hydrocarbons is meant to include normally liquid but distillable hydrocarbons as defined by the US Energy Information Association in their Glossary on DISTILLATE FUEL OIL. Information from this government agency is abstracted below:

No. 1 Distillate: A light petroleum distillate that can be used as either a diesel fuel or a fuel oil.

No. 1 Diesel Fuel: A light distillate fuel oil that has distillation temperatures of 550° F. at the 90-percent point and meets the specifications defined in ASTM Specification D 975. It is used in high-speed diesel engines such as those in city buses and similar vehicles.

No. 1 Fuel Oil: A light distillate fuel oil that has distillation temperatures of 400° F. at the 10-percent recovery point and 550° F. at the 90-percent point and meets the specifications defined in ASTM Specification D 396. It is used primarily as fuel for portable outdoor stoves and portable outdoor heaters.

No. 2 Distillate: A petroleum distillate that can be used as either a diesel fuel or a fuel oil.

No. 2 Diesel Fuel: A fuel that has a distillation temperature of 640° F. at the 90-percent recovery point and meets the specifications defined in ASTM Specification D 975. It is used in high-speed diesel engines such as those in railroad locomotives, trucks, and automobiles.

No. 2 Fuel Oil (heating oil): A distillate fuel oil that has a distillation temperature of 400° F. at the 10-percent recovery point and 640° F. at the 90-percent recovery point and meets the specifications defined in ASTM Specification D 396. It is used in atomizing type burners for domestic heating or for moderate capacity commercial/industrial burner units.

A preferred superheated fluid is or contains vacuum gas oil, sometimes referred to as cracker feed stock. When crude oil is refined the relatively heavy hydrocarbon obtained from a distillation column operating at atmospheric pressure is sometimes called gas oil. If the residual fraction from the atmospheric column is subjected to further distillation under vacuum, the heaviest fraction distilled is called vacuum gas oil. Other synonyms for VGO are Heavy Vacuum Gas Oil (HVGO), Heavy Gas Oil, Heavy Vacuum Distillate, Partially Refined Heavy Gas Oil, Vacuum Tower Heavy Gas Oil, Vacuum Tower Side Stream, Untreated FCCU Feedstock, Cracker Unit Feedstock, No. 6 Fuel Oil Blending Component, Heavy Fuel Oil Blending Component, Unfinished Bunker Fuel, or C20-C50 Petroleum Hydrocarbons. The superheated fluid can be entirely from a recycle stream as discussed below in conjunction with the review of the figures or a purchased stream such as LCO or mixture. When a purchased outside stream is used, it is preferably a distilled material, but it can contain some non-distillable material e.g. a mix of LCO and slurry oil can be used with the net effect being that some of the slurry oil will, after contacting ULO feed remain in the bottoms or residual fraction, permitting a greater percentage of the lubricating oil boiling range material in the ULO feed to be removed. In effect some slurry oil in the superheated fluid displaces some lube boiling range material in the ULO feed permitting more of the valuable paraffinic material to be "lifted" from the ULO while still leaving sufficient normally liquid hydrocarbon to permit pumping of the residual fraction. A very effective superheated fluid is one destined for charge to a cracking unit e.g., gas oil or vacuum gas oil obtained from a crude unit. This material is readily available in a refinery and ideal for use when the recovered fraction of the ULO will be fed to an FCC unit. Relatively large amounts of e.g., VGO may be used to lift lubricant boiling range components from ULO, and when large amounts of superheated fluid are used relative to ULO feed, the superheated fluid does not need to be heated as much.

In FIG. 1, as-received Used Lube Oil (ULO) flows from a feed storage system, not shown, through line 10 into the atmospheric flash vessel 20. The ULO feed has been preheated by means not shown to a temperature sufficient to permit atmospheric flashing of water and volatile hydrocarbons and subsequent vacuum flashing as discussed later of components boiling below the lube boiling or gas oil range. Water and volatile hydrocarbons or other volatile material which flashes at say atmospheric pressure and 400° F. are removed from the ULO feed via line 15 as a vapor. These vapors may be incinerated, used as fuel for heating needs of the process or otherwise treated. There are other modes of operation where more or less material is flashed from the ULO, but in many applications removing the materials which flash at 400° F. at atmospheric pressure will be preferred.

Dehydrated ULO is removed from vessel 20 via line 25 and charged to vacuum flash vessel 30. A pressure control valve not shown may be used to regulate flow from vessel 20 to vessel 30. In vacuum flash vessel 30 the temperature is slightly lower than the temperature in the atmospheric flash vessel as some cooling occurs due to flashing of water in vessel 20 and flashing of light hydrocarbons in vessel 30. Typically, a vaporized hydrocarbon stream comprising gasoline and diesel boiling range components is removed via line 35 for cooling, condensing and further handling by means not shown. The net effect of these atmospheric and vacuum flashing steps is to produce a used lube oil fraction with a significant reduction in material boiling below 600° F., though it should be remembered that one or more simple flashing steps will not produce a "clean cut" material. A flash stage is basically a distillation column with a single tray and such a device can only achieve a limited split of say material above 600° F. in the bottoms and material below 600° F. overhead. There will be considerable overlap in boiling range of the two streams, the overhead vapor and the bottoms liquid.

A dehydrated somewhat de-volatized ULO fraction is withdrawn from vessel 30 via line 32 and charged to the inlet of inline mixer 34. Depending on the intended use of the product, either a recycle fraction or an outside source of fluid may be superheated for use herein. When a lubricant base stock of high purity is desired, all or almost all of the superheated fluid will be a recycled lubricant boiling range fraction. A hot recycle fraction from a source hereafter discussed is also charged to the inlet of inline mixer 34 to produce a heated mixture of ULO feed and a recycled stream. This heated mixture is charged via line 36 to fractionator 40. Light hydrocarbons are removed via line 45 while a liquid fraction comprising a majority of the lubricant boiling range components in the feed is withdrawn via line 46. A portion of this liquid is withdrawn as a product fraction via line 48 while the remainder is recycled via line 50 through heat exchanger 60 to produce the heated recycle stream charged via line 54 to in line mixer 34. Not shown are many conventional elements of a vacuum fractionator including a vacuum system such as a steam jet ejector, pumps, condensers, and reflux lines to the column. Removed from the bottom of vacuum fractionator 40 via line 42 is a residual product which may be cooled by conventional means not shown and sent to storage.

The recycled fraction is heated in heat exchange means 60. A circulating fluid enters the heat exchanger via line 72, heats the recycled lubricant rich fraction and is returned via line 74 to fired heater 70. Although a fired heater is shown it is possible to use an electric heater or other source of hot fluid for use in heating the recycle liquid in heat exchanger 60.

When the recovered lubricant boiling range material is to be used as cracker feed, some and preferably all of the superheated fluid is derived from an outside source such as gas oil, vacuum gas oil, or even slurry oil, or other similar boiling range vaporizable liquid. These streams all tend to have more aromatics than a recycled lubricant boiling range fraction and therefore are easier to heat without forming coke. The same equipment used to form superheated vapor from a recycled lube fraction may thus be used to form superheated vapor from an outside source of distillate hydrocarbons.

The simplified representation in FIG. 1 omits many details such as pumps, temperature controllers and the like, but these features are conventional. The vacuum distillation column or columns should multiple column operation be preferred will have the following conventional components. Working from the bottom up, there can be a wash bed with sufficient wetting of surfaces to prevent coking or fouling. Above this will usually be a reflux section for heavy distillate comprising chimney trays, sieve trays, mesh packing or other structured packing along with means for adding reflux liquid. A similar section for light distillate will usually be above this. A de-mister will usually be added to an upper portion of the column so fine particles of liquid may be recovered as a liquid and retained in the vacuum column rather than being entrained out with the overhead vapor. In addition, demisters may be added to each flash vessel to removed liquid mist entrained in a vapor product.

Figure 2:
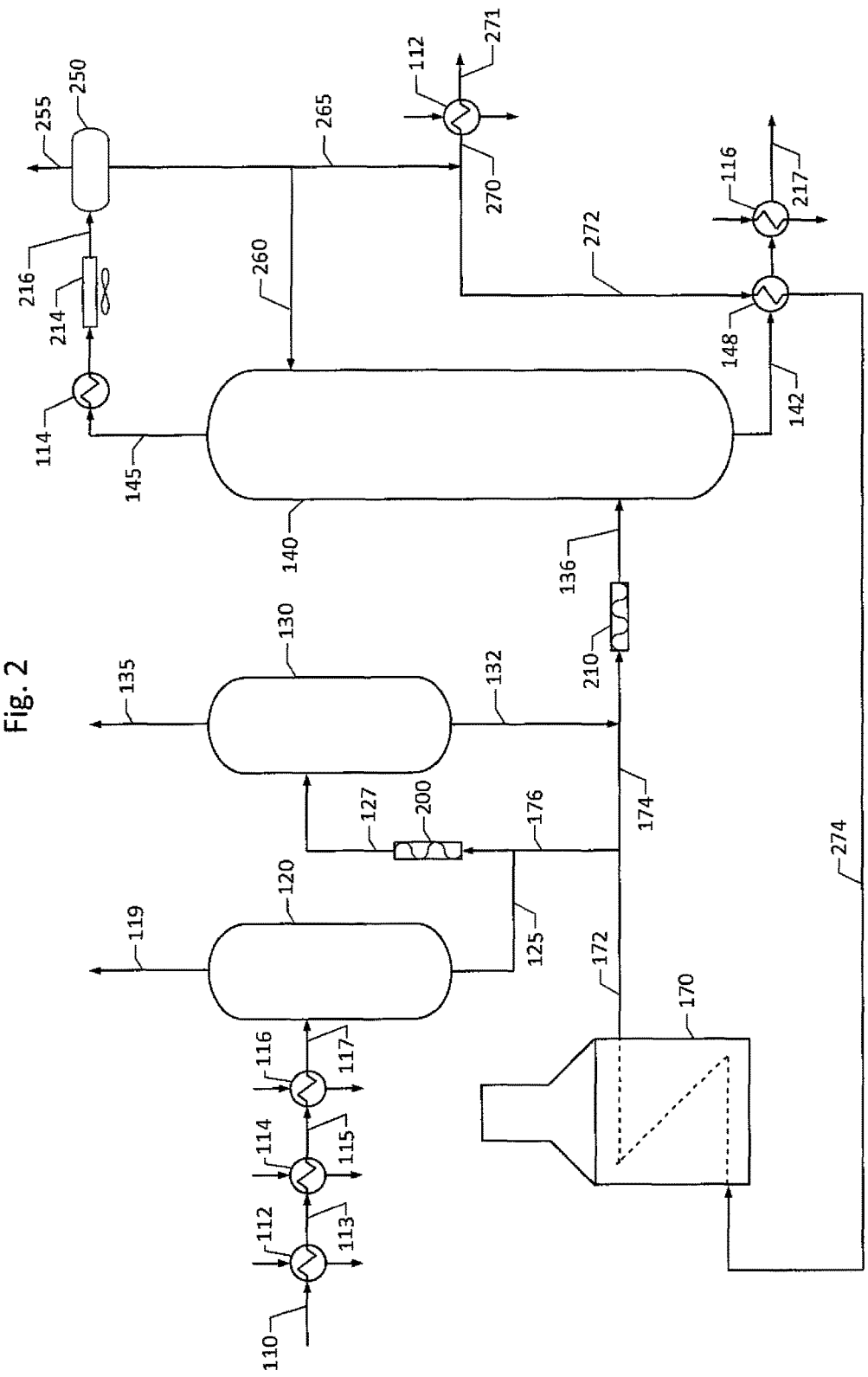
FIG. 2 is similar to FIG. 1, but shows more detail and preferred heat exchange and control elements.

FIG. 2 shows more details including extensive energy conserving features. In the embodiment shown only a single heater usually a fired heater is required to satisfy the heating needs of the process. This approach also uses the energy in various product/recycle streams to great advantage to provide needed heat inputs, cool product streams and reduce the amount of energy consumed in re-refining the ULO.

A ULO stream is charged via line 110 through at least one and preferably all of three heat exchangers 112, 114 and 116. The fresh ULO feed can be first heat exchanged against a liquid product lube boiling range fraction being removed from the process. This lube product typically about 70-90 LV % of the feed may be at a temperature of 300-500° F., typically about 400° F. It should be cooled prior to storage for safety reasons. This lube product stream is at just the right temperature and has just the right volume to supply most or all of the preheating needs of the process. The ULO feed typically at 60-80° F. in feed storage tanks is heat exchanged against a similar volume of lube product, to produce a partially or totally if desired preheated feed in line 113. Heat exchanger 112 produces a ULO stream having a temperature of say 300° F. in line 113. Next the feed may be further heated in heat exchanger 114 by heat exchange against vapors removed from the vacuum distillation column 140 as discussed hereafter. The overhead vapors from the column are theoretically at about the same temperature as the temperature of the condensed liquid removed from the overhead receiver. Heat exchanger 114 can be used to cool and condense the hot overhead vapors from the vacuum column. The condensing overhead stream can preheat the incoming ULO feed to the desired temperature. The overhead vapor stream from the vacuum column typically contains two to three times more material on a molar basis than the feed ULO. It is possible to heat the ULO feed to something approaching the temperature of the vacuum column overhead vapor say to within 20-40° F. The temperature of the by now thoroughly preheated feed removed from exchanger 114 via line 115 will be say 325° F. or slightly higher depending on the amount of heat exchange capacity one wants to buy and the amount of pressure drop that can be tolerated getting vacuum column overhead vapors through the heat exchanger.

If the temperature in line 115 is sufficient to flash off all water and all light hydrocarbons from the ULO feed, then no further heating is required. If a higher feed preheat temperature is desired to flash off more light hydrocarbons such as heavy gasoline or lighter gas oil fractions in the flash drum 130, then additional preheating is possible by heat exchange with a bottoms fraction in heat exchanger 116 as discussed in more detail hereafter.

The use of heat exchangers in refinery processing is conventional, but what is unusual and beneficial is the use of selected streams for preheating that are unlikely to do any damage in the sense of decomposing the ULO feed. The ULO feed is stable at temperatures encountered in a typical automobile engine and can easily tolerate temperatures of 400° F. for extended periods and even higher for short periods. The lube fractions recovered from the vacuum tower 140 are always below the temperature at which lube decomposition starts. If there are minor upsets flow rate and even temperature of heat exchange liquid to heat exchangers 112 and 114 may fluctuate some, but the temperature in these exchangers should never be high enough to cause significant additive decomposition. This is in marked contrast to what happens if a fired heater is used for preheating. A high temperature can be reached due to a temperature controller malfunction, or some portion of the fired heater can have a hot spot or a stagnant region where tube wall temperatures increase. Flow slows, fouling starts and progresses and will soon lead to complete plugging of a fired heater.

The use of either a recycled lubricant product or a fresh distillate material for heating will always be a "safe" way to heat ULO by heat exchange. When further preheating of ULO feed is required, it is possible to achieve some additional heating of ULO feed by heat exchange with at least a portion of the bottoms fraction removed from the vacuum distillation column. This bottoms fraction as removed from the vacuum column is hot and caution should be exercised in its use for heat exchange of ULO feed. Preferably the residual liquid has been heat exchanged or cooled to some extent by heat exchanger 116. Use of this hot residual stream to heat exchange a gas oil, vacuum gas oil or the like is a good way to quench the residual stream which usually will contain significant amounts of additives. This residual stream may also be used to preheat the ULO feed or a fraction thereof. When a ULO feed fraction is preheated by heat exchange against the column bottoms stream, some additive breakdown in the incoming ULO feed may occur and can be tolerated, especially if flow conditions are sufficiently vigorous so that "hot spots" do not develop and flow is fast enough to keep ULO feed moving rapidly through the exchanger. The advantage of use of residual liquid as a heating medium is that it may be used to heat the incoming ULO feed to a higher temperature than can be achieved using only overhead product vapor or overhead product liquid.

After the desired amount of preheating is achieved, the preheated ULO feed is charged via line 117 into atmospheric flash vessel 120 where water vapor and other light hydrocarbons are removed via line 119. This material may be burned to supply heat needs of the process or incinerated to destroy contaminants that may be present. Dehydrated ULO is then charged via line 125 to an optional in-line mixer 200 where the dehydrated ULO can optionally be further heated by direct contact heating with an outside superheated distillate stream, a superheated recycle product stream or both as discussed in more detail hereafter. The ULO is charged via line 127 to vacuum flash 130. Reduced pressure in vessel 130 allows most hydrocarbons boiling below the lube oil boiling range to flash and be removed via line 135. This material may be burned as fuel for the re-refining process, incinerated or further processed and recovered as a product after conventional cooling and condensing, The dehydrated somewhat de-volatized used lube oil is withdrawn as a liquid from vacuum flash 130 and charged via line 132 to mix with a heated recycle product stream 174. The two streams ULO and the superheated vapor merge either in or immediately upstream of optional inline mixer 210. The inline mixer is a preferred and conventional device available from several manufacturers. It is optional as careful control of pipe sizing and flow can and preferably does generate fully developed turbulent flow which does a good job of mixing two highly miscible fluids such as ULO and a superheated distillate boiling range fraction. Turbulent flow is also beneficial in keeping the pipe walls wet and somewhat "scrubbed" by the turbulent flow lessening the chance of fouling or plugging of pipe walls.

The mixture of ULO and added superheated vapor will generally be discharged as two phases, vapor/liquid, into vacuum fractionator 140 via line 136. This material will generally be at a temperature of 500 to 750° F., preferably 550 to 650° F., ideally 575-625° F. This mixture should be at a temperature sufficient to vaporize in the conditions existing in the vacuum fractionator at least 60-90 and preferably about 80 mole % of the lubricant boiling range components in the incoming ULO feed. It is possible by using pumps and a pressure to keep the material primarily or perhaps entirely in the liquid phase, but it will usually simply be at enough pressure to get the combined liquid stream or ULO and recycled product through the piping and mixer if used and into the vacuum column 140.

Vacuum column 140 is preferably a conventional distillation column with enough trays or internal packing material to help separate lube oil boiling range materials from heavy materials. The primary and preferably the sole means of heat input into the column is the high temperature of the feed stream to the column. The mixture of ULO and injected superheated vapor whether recycled or fresh should be heated by the injection of superheated fluid to a temperature sufficient to achieve the desired amount of vaporization in the vacuum column. There must be enough heat in the feed stream to vaporize all the recycled lube stream used for heat input and the desired amount of lube oil components recovered from the ULO. Typically, 50-90%, preferably 70-85%, and ideally 70% of the lube boiling components in the ULO will be recovered as product. If not enough energy is added to the column in the form of a hot feed mixture, then less lubricant boiling range material will be recovered with overproduction of the generally less valuable residual fraction. There is an upper limit on feed vaporization in that it is important to leave some lubricant boiling range materials in the bottoms product to permit its withdrawal as a liquid and facilitate further handling. This material has value as an asphalt extender, addition to coker feed or other uses.

Vaporized lubricant boiling range materials are withdrawn overhead from vacuum fractionator 140 via line 145. Although it is possible to use conventional methods of handling this material e.g., cooling in fin fan coolers or heat exchange with cooling water, it is preferred to use vaporized lube boiling range hydrocarbons for heat exchange in this process. The temperature of the overhead vapor, generally 300-400° F., typically 350° F. makes it ideal for preheating of fresh ULO feed. The moderate temperature of the vaporized lube boiling range material is ideal for preheating ULO feed without decomposing it. Preferably hot overhead vapor is charged via line 145 to heat exchanger 114 as previously discussed to heat incoming fresh ULO feed. This heat exchange may condense enough overhead vapor to permit recovery of the desired amount of liquid for column reflux, product recovery and for use as a recycled heating medium in the in-line mixer 210. If the amount of heat exchange in exchanger 114 is not sufficient to produce enough condensed liquid, then additional cooling may be done by heat exchange with water, not shown, or use fin fan coolers 214 with the condensed liquid charged via line 216 to overhead receiver 250.

Preferably essentially all overhead vapor removed from the vacuum column is condensed as the lighter materials will usually have been removed either by the atmospheric flash 120 or vacuum flash 130. Some light ends may remain and these will be removed from the process via line 255, connective with a conventional vacuum means such as a steam jet ejector, not shown. Depending on how "hard" the process is run, there may be some breakdown of additive package components or thermal cracking of the lubricant boiling range hydrocarbons. The vacuum system should be sized large enough to handle these low boiling materials.

The cooled and condensed lubricant boiling range materials are collected in overhead receiver 250. The desired amount of reflux is charged via line 260 back to the vacuum column and the remainder passes via line 265 for product recovery and recycle. The net production of lubricating oil boiling range materials is withdrawn as a liquid via line 270. This liquid is usually still hot as the condensing system preferably removes just enough heat to condense the overhead vapor, but not to cool it further. For safety the recovered lube product should be cooled before storage. This stream is typically 60-90 Liquid Volume % (LV %) of the dehydrated ULO feed, preferably about 80%, and is an ideal stream for charging via line 270 for heat exchange with incoming ULO feed in exchanger 112. The product liquid is a liquid so a compact L/L heat exchanger may be used. The product liquid in line 270 is one of the "coolest" streams in the plant though considerably warmer than the ULO feed so it may be safely used to heat incoming ULO with little or no risk of thermally degrading the ULO feed. The net production of lubricating oil boiling range hydrocarbons is removed from the plant via line 271 and charged to storage tanks, not shown.

The remaining portion of lubricant boiling range hydrocarbons is charged as a liquid via line 272 for superheating and reuse in the process to vaporize distillable components from the feed ULO. To that end recycled product must pass through a heater such as fired heater 170 to produce a superheated stream charged via lines 172 and 174 to mix with the dehydrated ULO feed in line 132 withdrawn from the vacuum flash vessel 130. Preferably the recycle product is first heat exchanged against a bottoms fraction withdrawn from vacuum column 140, namely the residual fraction 142. This residual fraction representing perhaps 10-40% and preferably about 20 LV % of the ULO is withdrawn as a liquid from the bottom of the column usually at a temperature near that of the feed temperature entering the column. As such there is a significant amount of high grade heat which may be used to achieve significant preheating of recycle liquid in line 272 in heat exchanger 148. This reduces the amount of fuel, electricity or other energy which must be added to the recycle product stream. The bottoms product withdrawn from the vacuum column 140 may also be used to achieve additional preheating of ULO feed by heat exchange against ULO feed in exchanger 116. Preferably heat exchange of the unstable ULO feed is done only when the column bottoms fraction has been cooled to some extent by heat exchange or other cooling so that the bottoms fraction is at a temperature below that which will cause thermal cracking or degradation of ULO feed. After such optional heat exchange and further cooling or energy recovery by means not shown, the bottoms fraction is recovered as a heavy product of the process and charged via line 212 to product storage, not shown.

The heated recycle material withdrawn from the furnace 170 via line 172 may also be charged via line 176 to mix with liquid withdrawn from the atmospheric flash vessel 120. This may be done when e.g., the feed ULO contains a relatively large amount of gasoline or other lighter boiling components which are to be recovered in the vacuum flash vessel 130. If higher temperatures are needed in vacuum flash 130 mixing ULO with some heated recycle product is an easy way to achieve such heating. Mixing may occur simply by in line mixing as the fluid flows through the pipes or preferably in-line mixer 200 may be used to facilitate rapid mixing.

DESCRIPTION OF PREFERRED EMBODIMENTS

Discussion

The discussion that follows focuses on feedstocks then each step of the process.

Feedstocks

Any feed containing a normally liquid hydrocarbon can be heated using the process of the present invention. The normally liquid hydrocarbons include C5 and heavier hydrocarbons e.g., naphtha boiling range up through residual fractions. Heavy feeds are contemplated for use herein including those which are so heavy that they are not liquid at room temperature. For example, grease, wax, petrolatum or indeed any hydrocarbon having a high melting point may be used as feed. These materials upon heating will form liquids and may be used as feed. Treatment of solids is outside the scope of the present invention i.e., treatment of coal or dirt contaminated with oil is outside the scope of the present invention. What is essential for the practice of the present invention is that the feed have at least some distillable components boiling above the gasoline boiling range and direct contact heating of the feed by mixing with a hot recycled stream comprising e.g., lubricant or gas oil boiling range hydrocarbons.

ULO is the feed contemplated for primary use herein. The ULO will frequently contain both light and heavy contaminants and large amounts of paraffinic hydrocarbons in the C16 to C50 range. Light contaminants include water, naphtha and some impurities introduced during the ULO collection process. Heavy contaminants include the additive package. When processing ULO, the economic incentive is usually to vaporize as much ULO feed as possible. This can create a problem as the residue will not flow when too much of the feed is vaporized. About 60-90% vaporization of the dry used oil will usually be the target with 80 LV % vaporization of dehydrated ULO feed giving good results.

ULO is the most difficult to re-refine of industrial waste oils, but other waste or low value oil containing liquids may be treated as well. By way of example but not limitation, fluids which may be treated include cutting oils, crude oil emulsions, tank bottoms and any of the myriad other materials mentioned in the voluminous art discussed above on re-refining of used lubricating oil, all of which are incorporated herein by reference. The process can tolerate some sediment and solids provided the plant is built so that large sized particles can be filtered and small sized particles can be carried out with the residual liquid fraction without clogging the plant.

Dehydration

This is a preferred but not essential step. When used dehydration or removal of water and light volatiles typically those boiling in the gasoline, or gasoline and diesel, boiling range and lighter occurs upstream of the ULO re-refining plant or at some point intermediate ULO collection and the re-refining plant. If the feed stocks contain little in the way of volatile material or the vacuum system is sufficiently robust to remove the volatiles in the feed, then dehydration is not required. Most refiners will prefer to dehydrate the feed and remove the "light ends" such as gasoline added by crankcase dilution or some light solvent dumped into the used lube oil container by a worker in a garage. The removal of water and light ends simplifies the operation of the downstream portions of the plant insulating it to a great extent from upsets and gas pains which might be experienced by an unusual used oil feed.

This step will usually be run at a temperature above 200° F., preferably above 300° F. and most preferably at 400° F. or more. Atmospheric, pressure will usually be preferred to simplify construction and operation, but it may be operated under vacuum when desired. The temperature and pressure should be sufficient to remove at least a majority, and preferably at least 90 mole % of the water. Preferably this step removes a majority of the gasoline and lighter boiling range components although in some circumstances it may be beneficial to have e.g., a first flash removing water and light naphtha and other light materials that may be present followed by a second flash at lower pressure or higher temperature to remove gasoline boiling range components, say those boiling below 400° F.

Although we prefer to use a simple flash drum equivalent to one theoretical tray of separation, it is possible to conduct the flash in a column to achieve some measure of separation of lighter components removed from the ULO.

Vacuum Flash

This step is designed to remove those molecules from the ULO which can be removed at relatively mild conditions. This will include some gasoline components and some lubricant boiling range components. The vacuum flash will typically be at the same or a higher temperature than the initial dehydration treatment. The vacuum flash will be at a lower pressure to facilitate flashing of molecules boiling below the lube oil boiling range. This flash will usually be a simple flash in a flash drum equivalent to a one theoretical tray distillation column. Where desired, a conventional vacuum distillation column may be used, but for most purposes a simple flash drum will be sufficient and will be all that is used. The vacuum flash removes a poorly defined fraction comprising heavy gasoline and lighter lubricant boiling range components. This material will usually have significant value as a fuel for use in the re-refining process or for sale.

The temperature in the vacuum flash will typically be 300 to 650° F., preferably 400 to 600° F., and ideally about 400° F. The pressure will typically be 5 to 250 mm Hg, preferably 10 to 200 mm Hg, ideally about 20-50 mm Hg. Temperature and pressure are related and when a relatively clean feed with little in the way of light ends is being processed or when a robust vacuum system is available, it is possible to run the vacuum flash at the lower range of temperature and with a higher vacuum. If the feed is heavily contaminated or for some reason light ends are being generated due to thermal cracking in the system or the vacuum system is not working well, then higher temperatures will be required to remove the desired amount of distillable hydrocarbons in the vacuum flash.

The main function of the vacuum flash is to recover as much as possible in the way of distillable liquids from the ULO feed at conditions which cause no or only modest amounts of thermal cracking of ULO feed or decomposition of thermally decomposable materials in the ULO feed such as the additive package. The vacuum flash preferably removes most or all of the materials which are recoverable from a ULO feed using conventional technology. There is no need to use a superheated fluid to remove gasoline when simple heating of the ULO by conventional means will suffice.

In some circumstances e.g., when making a cracker feed stock, re-refiners can omit the flash and just send the ULO feed through one or more preheating steps using one or more conventional fired heaters and charge sufficient superheated distillate to lift the desired amount of material from the ULO feed. This greatly simplifies plant construction as all stages of the process can be done in the direct contact heating portion of the plant, discussed next. Such a simple plant will usually be cheaper to build and this approach may be satisfactory when the distillate boiling range portion of the product can profitably be sold as a crude component or blended into the feed to an FCC unit.

Direct Contact Heat Exchange/Lube Distillation

This is the most difficult portion of the plant to operate because the temperature and conditions required to vaporize lubricant boiling range components in the ULO feed could easily thermally crack lube portions of the feed, degrade additives and other thermally decomposable compounds in the ULO feed and foul the heating equipment of the plant. Thermal cracking of hydrocarbons is a function of time and temperature and the nature of the hydrocarbon. The earliest cracking processes e.g. the Dubbs process subjected a heavy crude oil fraction to high temperatures which cracked some of the larger molecules to form some light ends and other lighter molecules. The formation of smaller molecules from bigger ones meant that the product contained not only viscous heavy long-chain feed molecules but also some lighter ones that were thinner. Refiners could make a low viscosity product by cracking a heavy feed sufficiently so that the feed made its own cutter stock hence the name "visbreaking" for one type of early cracking process. Thermal cracking is not all bad, but in most instances we prefer that our plant be run to minimize thermal cracking. Thermal cracking is an important parameter and frequently a limiting factor on severity so it is reviewed below.

In most hydrocarbon processes there is a tradeoff between reaction temperature and residence time of reactants. Because visbreaking is a well-known and widely practiced process correlations have been developed so that it is possible to express precisely the severity of a visbreaking process. Although cracking of ULO feed is not the goal of our process and in general is something we avoid, the concept of "severity" is a good way to view one of the constraints of our process namely ensuring that the feed ULO does not foul up the plant.

As in visbreaking a given severity does not mean that a certain amount of fouling, additive degradation, or thermal cracking of ULO will occur, rather it means that it is possible to predict that if all other reaction parameters are unchanged (e.g., feed composition, reactor pressure) except for the temperature and residence time in the reactor, two operations can be compared and it can be determined whether one process is more severe than the other. Equations and tables have been developed for comparing reaction severities. Typical of such presentations is the discussion of "soaking factor" in Petroleum Refinery Engineering—Thermocracking and Decomposition Process—Equation 19-23 and Table 19-18, in Nelson—*Modern Refining Technology*, Chapter 19, which is incorporated herein by reference. Although that text uses the term "soaking factor", the term "ERT" or "Equivalent Reaction Time" in seconds as measured at 427° C. (800° F.) is used in this specification to express visbreaking severity. Numerically soaking factor is the same as ERT at 427° C. (800° F.). In very general terms the reaction rate doubles for every 12 to 13° C. increase in temperature. Thus 60 seconds of residence time at 427° C. is equivalent to 60 ERT, and increasing the temperature to 456° C. would make the operation five times as severe or 300 ERT. Expressed in another way 300 seconds at 427° C. is equivalent to 60 seconds at 456° C., and the same product mix and distribution should be obtained under either set of conditions.

The visbreaking process conditions which may be used or which can be tolerated depend to some extent on the amount of thermal cracking of ULO components that can be tolerated. For conventional visbreaking of a heavy feed sufficient to reduce the viscosity to enhance value of the product, processing severities are typically in the range of an ERT of 250 to 1500 ERT seconds. In general terms this is about an order of magnitude more cracking than is desired or required for ULO re-refining. Usually it will be beneficial to design the plant so that the ERT from the point of mixing just upstream of the vacuum column to the point when residue is removed from the vacuum column is less than 100 ERT seconds and more preferably less than 50 ERT seconds. When the recovered lube product is destined for reuse as a lube blending stock, it will be beneficial to limit ERT to 25 or less, with an ERT of 2-10 being most preferred.

ERT is a significant constraint or at least a guideline for the operation of the heater, mixing zone and vacuum flash. ERT can in effect be an upper limit on severity. Another constraint is operating the vacuum column at a temperature and pressure sufficient to vaporize the desired amount lubricant boiling range hydrocarbons in the ULO feed. Distillation is a function of temperature and pressure alone, save for any thermal cracking of lube or degradation of additive materials which may occur in the vacuum column. Successful recovery of a desired amount of lube product requires a minimum temperature while limiting thermal cracking involves time and temperature. The heater, mixing zone and vacuum column should be operated to keep the ERT severity at a relatively low level.

Additive based fouling is often experienced but not well understood. The zinc additives such as zinc dialkyldithiophosphates (ZDDP) adhere to metal surfaces and become "stickier" as temperatures increase. This is a wonderful property in an engine, but causes havoc or at least fouling in a re-refining process. ZDDP decomposition seems to start above 400° F. and increases exponentially above that temperature though the initial decomposition rate is relatively low. The tendencies of ZDDP to stick to hot metal surfaces is the most troubling aspect. If the feed ULO is exposed to any surfaces which are hot, the oil tends to stick and given the long residence time will eventually foul the surface.

Thus there are three constraints which must be considered in designing and operating the plant. The vacuum column has to run hot enough and at a low enough pressure to allow vaporization of the desired amount of lubricant boiling range material. The ULO feed should not be subjected to excessive reaction severity as that will produce extended thermal cracking and some downstream additive degradation, primarily in the bottoms of the vacuum column. Finally, the additive material should not be exposed to hot metal surfaces lest the additive start fouling them eventually shutting the plant down.

Using a superheated fluid of distillate or a recycled lubricant boiling range stream as the heating medium instead of hot metal to heat the ULO feed solves the most significant problem—additive induced fouling of metal surfaces. The hottest thing to contact the ULO feed is a completely miscible material, e.g. a superheated fluid of either vaporized outside distillate hydrocarbons or recycled lubricant boiling range material derived from the ULO feed. There is no "hot" solid surface for additives to cling to, the heat does not transfer across a hot metal surface rather it is brought into the plant in the form of a superheated fluid. Some additives may decompose, but they will not preferentially deposit upon hot metal surfaces as the metal surfaces are cooler than the fluid contained or flowing in them. Small amounts of additive decomposition are not desired but can be tolerated. Using superheated distillate or a recycled lube fraction or a mixture allows all process constraints, namely thermal cracking, minimum temperature and no metal hot spots to be satisfied.

The lubricant boiling range material recovered as a product of the process is a distilled material. In the early days of the catalytic cracking process, refiners knew that the catalysts and technology available could not tolerate the "heavy ends" of the feed usually because of metals content. By distilling the feed and sending to the cat cracker only the distilled feed, the metal problems were left behind in the crude column used to prepare cat cracker feed.

In our ULO re-refining process the troublesome additives are left behind in the vacuum column so the recovered product is generally free of metals. Like gas oil recovered from a crude column in the early days of refining, our gas oil recovered from vacuum distillation of ULO is free of metals. The hard part of any ULO re-refining process is getting the ULO feed hot enough in a continuous process so that the lube components can be vaporized. Re-refining is easy to do in a laboratory. Simply heat up a flask preferably under vacuum, raise the temperature until the desired lube boiling range components are recovered then discard the by-now-thoroughly-fouled flask. In contrast a commercial process has to operate for months and preferably years without being shut down due to fouling. Our superheated fluid heating medium either a recycled lubricant boiling range hydrocarbon fraction or a purchased material such as a slurry oil or other distillate boiling range material that is free of metals can tolerate much more severe heating than ULO feed so we meet the heat needs of the process without fouling up the heater.

When a recycled lubricant boiling range material is the superheated fluid, it should be noted that this fraction is highly paraffinic. It is more susceptible to thermal cracking than gas oil with a similar boiling range derived from most crudes. Fortunately, thermal cracking can be minimized by designing the heater or heat exchanger used to head the recovered and recycled lube boiling range material so that there is a low residence time in the heater or heat exchanger. When contacting ULO feed the residence time in the mixer (if used) and the piping leading into the vacuum column can be very short.

Thermal cracking of the recycled lubricant boiling range fraction during heating or superheating may be minimized in several ways. When a fired heater is used, it is possible to reduce the residence time of the recycled gas oil by sizing the heater for high superficial velocities in the tubes and designing the heater to minimize high tube wall temperatures. In a somewhat similar application using coker heaters, it was reported that great variability in heater performance or run length was observed. The author reported that some heaters had coil outlet temperatures of 750-760° F. and low flux rates but could not run for more than 2 years, while others had higher outlet temperatures and flux rates and ran for four years. Different techniques were discussed which could be used to reduce residence time of oil feed in the furnace, both overall and at high temperature. The use of higher mass velocities and steam injection reduced oil residence time from 60 seconds to 15 seconds. The author reported that residence time of the oil film at peak film temperature, 850° F. for this coker furnace, was reduced from 15 seconds before the revamp to less than 3 seconds. Barletta, Tony, "Why Vacuum Unit Fired Heaters Coke," *Petroleum Technology Quarterly*, Autumn 2001 issue.

The temperature required to vaporize lube oil boiling range hydrocarbons is less than that required for efficient operation of a coker, but the principle is the same. Careful furnace design can minimize high temperature experienced by the oil in the furnace. In addition, it may be beneficial in our process to operate with addition of some steam to reduce residence time of recycled gas oil in the heater. This steam will increase the pressure in the distillation column and will increase the load on the vacuum system, but steam can generally be condensed by cooling residual overhead vapors. Thus the bulk of the steam injected can be removed by downstream condensation rather than using the vacuum system.

An even more effective way to reduce thermal cracking of a recycled gas oil fraction during heating is to use a heat exchanger. A fired heater can produce a high temperature fluid, and this can be heat exchanged against a recycled gas oil fraction. The tubes in a fired heater can easily be 50-100° F. higher than the target discharge temperature so oil being heated can start to coke. In contrast, with a heat exchanger rather than fire being on the other side of the tube wall, there is a fluid such as a thermally stable heat transfer fluid which is hotter than the recycled gas oil but not nearly as hot as the radiant or convection section of a fired heater. It is possible to operate with a heat transfer fluid having a temperature of say 750° F. when heating a recycled gas oil fraction to 725° F. The highest temperature the recycled gas oil can experience is that of the heat transfer fluid, thus 750° F. is the highest temperature the recycled gas oil will experience. If a fired heater had been used, the recycled gas oil could easily see a tube wall temperature of 800° F. or higher. To further reduce thermal cracking when a heat exchanger is used to heat the recycled gas oil fraction, it is beneficial to use one of several proprietary heat exchangers which are designed to enhance heat transfer rates for temperature sensitive products. Suitable heat exchangers include the Sulzer SMXL multitube or monotube.

When an "outside" material rather than a recycled one is used for the superheated fluid, it should be a relatively clean stock preferably one obtained by distillation. These will heat the ULO feed, but such residual streams will end up in the residue of the ULO re-refining process. Distilled materials form a superheated fluid generally free of metals so the recovered lubricant boiling range material lifted from the ULO feed will also be metal free and an ideal feed for an FCC or other refinery processing unit. Various refinery streams may be used to form the superheated fluid such as kerosene, jet fuel, gas oil, vacuum gas oil and many others. At least a majority, by weight, of the "outside" material should boil above 350-400° F. and below 1000-1050° F.

Some aromatic rich materials produced by FCC units work especially well such as LCO (Light Cycle Oil) or slurry oil. These aromatic materials are thermally stable and ideal for heating without coking, but they are also difficult to crack in the FCC and are a tolerated but not preferred cracking stock.

Sufficient superheated fluid should be injected to "lift" or vaporize at least a majority by weight of lubricant boiling range hydrocarbons in the ULO feed. When a feed preparation step is conducted before contact with superheated fluid, dehydration and/or an initial flashing step is practiced which will remove some lubricant boiling range hydrocarbons. The ULO may be treated either "raw" or as received or after one or more feed preparation steps, and some lubricant boiling range material removal may occur prior to contact with superheated fluid.

Direct Contact Heating of ULO Feedstocks

This portion of the process directly mixes the superheated recycled lubricant boiling range hydrocarbons recovered from the product with the incoming ULO feed. There is direct contact heating of the relatively cool ULO feed, typically between 350-450° F., with the superheated fluid, typically at 600-800° F. when a recycled paraffinic rich material is used and from 600-900° F. when a more stable aromatic rich fluid is employed. Regardless of source, the superheated fluid should be used at a temperature and in amount sufficient to achieve the desired temperature and desired amount of product uplift in the vacuum column.

At its simplest direct contact heating can occur in a length of pipe. The fluids will be flowing at high velocity in fully developed turbulent flow which is an effective method of mixing ULO feed with recycled superheated lubricant boiling range hydrocarbons. To improve mixing it will be beneficial in some circumstances to contact the two fluids, ULO feed and recycled superheated fluid, using an in-line mixer such as the Sulzer Compax. This device if used may be placed near the heater or heat exchanger outlet but is preferably placed near the inlet of the vacuum flash vessel for mixing of the superheated distillate hydrocarbons with ULO feed. In such a mixer multiple mixing elements create turbulent flow and good mixing. Uniform mixing can be achieved within three pipe diameters downstream of the injection point. Other in-line mixing devices may be used, if desired.

The present invention is a breakthrough in ULO processing. Our process uses a superheated distillate material to heat ULO rather than hot metal to vaporize lube components. Quite a lot of heat energy is added via the superheated fluid, enough to vaporize the desired amount of lubricant boiling range material in the ULO feed and to maintain most, preferably all, of the added superheated fluid in the vapor phase. Using this approach, the ULO feed need never be exposed to heated metal surfaces which can foul and shut down the plant. The hottest thing the ULO "sees" is a superheated fluid which is generally compatible with the ULO feed. The heat needs of the process are met by heating either a relatively clean distilled product such as the lubricant boiling range hydrocarbons recovered from the ULO feed or by heating a non-recycled distillate material. Thermal cracking of the superheated material can be reduced by selection of a stable material and/or by careful design of any fired furnace used for heating thereof. The material destined for superheating may be gently preheated by heat exchange, thus limiting the amount of heating or superheating needed in a furnace. Further reduction in thermal cracking of superheated material may be achieved by incorporating into the tubes in line mixers or wall wipers that move recycled gas oil from the metal tube walls to central portions of the tube thereby reducing extended exposure of oil to high temperatures at the tube wall. The ULO feed is efficiently mixed with the superheated fluid either by direct contact in a pipe operating with turbulent conditions and/or using an in-line mixer.

It is possible to operate the entire process with multiple flash vessels and a vacuum fractionator with only a single heat source, namely a fired heater which directly or indirectly heats the recycled lube oil fraction. It is even possible to apportion this heated or more accurately superheated fraction to supply the heat for vacuum fractionation and as the sole source or supplemental source of heat input for the vacuum flash or even the dehydration step. Usually some exchange of feed ULO with liquid product streams will be preferred for maximum energy efficiency.

Although the Figures illustrate the process with a dehydration flash, atmospheric flash and vacuum fractionator, it is possible to combine one or more of these steps, e.g., distillation and atmospheric flash or removal of multiple product fractions from the vacuum column such as a light lube oil fraction and a heavy lube oil fraction in addition to the bottoms residue fraction. Although mention has frequently been made of recovery of lube oil boiling range hydrocarbons, these recovered materials have myriad uses including as a lube blending stock with or without hydrotreating, as fuel, or as cat cracker feed.

In some circumstances, the process may be run to have only a combined dehydration and flash step before the ULO "sees" the superheated fluid. This may be the case when the single flash step produces enough burnable material to supply the fuel needs of the process, and there is much demand for either the liquid product comprising the lubricant boiling range fractions or less frequently for the bottoms product that may be used as an asphalt blending component. In some circumstances it may be beneficial to have a dehydration step and then a flash step which removes primarily gasoline boiling range materials. An additional flashing or even fractionation step may occur when it is desired to obtain a diesel product or a gasoline and/or diesel product which has a narrower boiling range.

When the most valuable end product is a liquid fraction comprising the lubricant boiling range material and this material will be used a feed for an FCC unit, then the process will be run to maximize production of this stream. If a lubricant product is desired, it may be beneficial to flash and/or fractionate enough lighter hydrocarbons to minimize the amount of distillation required for the lubricant product.

Minimum Capital Case

In some locations there may be little or no market for re-refined lubricating stock and/or an excellent market for FCC feedstock. The plant can consist of a heater, a length of pipe and a vacuum flash. The heater can be a simple fired or electric heater to superheat the distillate. A length of pipe will suffice as a contacting zone where fresh ULO feed and superheated fluid are mixed. The mixture can be discharged from a pipe, or across a valve into a vacuum flash where most of the ULO feed by weight is removed as an overhead vapor along with most and preferably all of the injected superheated fluid. In such a simple plant the separation between lubricant boiling range components and the residue fraction remaining will be poor. A single stage cannot do much in the way of fractionation other than make a rough cut between distillable and residual components in the ULO. In some cases, this simple plan and plant will have the best return on investment making it possible to have ULO recycling facilities in multiple locations wherever ULO may be found. A fired heater or electric heater may be used to superheat the fluid charged to the ULO vaporizer and when a material such as LCO is used, a simple design is possible for the heater as LCO is tolerant of rough heating.

Process Optimization

In many cases it will be preferable to have a more complex plant with a dehydration unit, a flash to remove gasoline and the like from the ULO feed and a vacuum flash and vacuum fractionator when greater separation of recovered components is needed. Dehydration and flashing of gasoline and the like significantly reduce the amount of heating required when lubricant boiling range components are vaporized, but there is a cost to a more complex plant. Additional preheating of ULO feed just prior to contact with superheated fluid will also reduce the amount of thermal energy which must be supplied via superheated fluid addition, but such severe preheating may degrade to some extent the additives in the ULO which can spread reactive chloride species throughout the product spectrum.

Some heat exchange will usually improve the economics of the process with various hot liquid and vapor streams used to preheat incoming feed. The residual liquid remaining after processing is a source of high grade heat which may be used to preheat the ULO feed or, preferably, the superheated fluid. The liquid residue additive concentration has been significantly increased due to the "lift" of the lubricant boiling range components from the ULO so it should be removed from the process and cooled relatively quickly.

A hybrid approach on superheated fluid can also be used when desired, i.e., some heating can be achieved with recycled superheated lubricant fluid and heating taken to completion with superheated LCO or the like. In some circumstances it may be beneficial to use a blended superheated fluid made of a mix of recycled lubricant boiling range materials and purchased distillate.

The residue fraction resulting from ULO processing should contain enough normally liquid hydrocarbons to permit handling of this material. Because the "lift" of lubricant boiling range hydrocarbons from the ULO can be done quickly, it is possible to run the process with greatly reduced breakdown of the additive package. This can be beneficial when some portion of the ULO residual has value in other products e.g., the polymer viscosity modifier can be a valuable blending component in asphalt. Minimizing additive breakdown will also improve the quality of lubricant boiling range hydrocarbons recovered as a product which may be of minor or major importance depending on the use of this product. The residue fraction must have enough normally liquid hydrocarbon to flow out of the vessels and to permit pumping and conventional handling. When an outside, aromatic rich stream is used to form all or part of the superheated fluid, the heavy aromatic rich portion of the purchased feed can remain in the residual product from the ULO re-refining process, in effect displacing high value paraffinic molecules with lower value high boiling aromatic molecules. More information on use of re-refining residue as an asphalt extender or improver is disclosed in U.S. Pat. No. 6,270,657 B1

The lubricating boiling range fraction recovered by our process has exceptional value as an FCC stock, and this is important for several reasons. There are hundreds of FCC units in the USA and over 400 worldwide so there are ample markets for recovered lube boiling range product. Although it will typically be a small part of the feed blend to an FCC, refiners know that gasoline yields are strongly affected by hydrogen content of the feed. Increasing the hydrogen content of the feed from 11.1 to 13.1 increased gasoline yields from a typical US FCC unit from under 52 LV % to over 69 LV %. http://www.uop.com/?document=the-impact-of-bitumen-derived-feeds-on-the-fcc-unit&download=1
Typical used lube oil fractions have a hydrogen content of 13-14 wt % so the lube boiling range material recovered by our process will also be hydrogen rich. A recovered lubricant boiling range material can be a very important though relatively small part of the feed to an FCC.

Our recovered lube boiling range product will also have value as a fuel or blending stock, but the requirement to use ultralow sulfur fuels or other fuel quality regulations may prohibit its use as fuel in some areas. There will usually be some sulfur in our product since sulfur compounds are an important part of lubricating oil. Such modest sulfur amounts are not a hindrance to use of our product as FCC feed.

The residual liquid product of our process can be used as an asphalt extender. The exceptional low severity processing which lifts the lubricating oil boiling range molecules from the ULO feed preserves most and preferably essentially all of the polymer rich additive package. This material will have little or no smell at ambient temperatures or at the temperatures required during construction of asphalt roads. We smelled the cooled material produced in our laboratory work, and it had no smell. Based on the teachings of U.S. Pat. No. 6,270,657 B1 which used steam to lift lube oil from ULO, our material should have even less of an odor when used in an asphalt blend.

Steam can be a reactive material at the temperatures needed to vaporize lubricant boiling range hydrocarbons and our hydrocarbon material will have no or at least greatly reduced reactivity with ULO.

Our process provides a cost effective way to recycle ULO. A relatively large plant can be used for central collection and re-refining. A working plant can be made with a single superheater for distillate, a pipe for contacting of ULO with superheated distillate, and a vacuum flash for separation of lubricant boiling range vapors from a residual liquid phase. Such a small plant will not be as energy efficient as a large one which can take advantage of multiple heat exchange steps, but in some locations recycling ULO at low cost and with a low capital investment is more important than doing so with optimum energy efficiency. Because of the simplicity of our process, it may be skid or truck mounted permitting small mobile units to process the ULO where it may be found.

Mention of a patent or document is intended to incorporate by reference said patent or document.

We claim:

1. A process for re-refining a used lubricating oil (ULO) containing lubricant boiling range hydrocarbons and a thermally unstable additive package which fouls metal surfaces used to heat said ULO to vaporize said lubricant boiling range hydrocarbons comprising:
   a. direct contact heating of said ULO with a superheated vapor comprising at least a majority by weight of distillate boiling range hydrocarbons to form a heated mixture of said ULO and said superheated vapor,
   b. flashing or fractionating said heated mixture to produce a vapor fraction comprising at least a majority of the lubricant boiling range hydrocarbons in said ULO feed and a residual liquid fraction comprising at least a majority by weight of said thermally unstable additives or the decomposition products thereof, and a minority by weight of said lubricant boiling range hydrocarbons in said ULO feed,
   c. cooling and condensing at least a portion of said vapor fraction to produce a liquid product comprising lubricant boiling range hydrocarbons recovered from said ULO feed.

2. The process of claim 1 wherein at least a portion of said vapor fraction or a liquid stream derived therefrom is heated to produce at least a portion of said superheated vapor.

3. The process of claim 1 wherein at least a portion of said distillate boiling range material is selected from the group of gas oil, vacuum gas oil, cycle oil or slurry oil from a catalytic cracking unit and mixtures thereof.

4. The process of claim 1 wherein said ULO feed contains water and is dehydrated prior to contact with said superheated vapor by heating said ULO feed to a temperature and at a pressure sufficient to dehydrate said ULO feed.

5. The process of claim 4 wherein said ULO feed contains both water and hydrocarbons boiling below the lubricant boiling range, dehydration of said ULO feed occurs at atmospheric pressure to produce dehydrated ULO feed and said dehydrated ULO feed is charged to a vacuum flash operating at a temperature and under vacuum sufficient to vaporize at least a molar majority of the hydrocarbons boiling below the lubricant boiling range to produce a dehydrated, flashed ULO feed which is then contacted with said superheated vapor.

6. The process of claim 4 wherein said ULO feed is pre-heated for dehydration by heat exchange with vaporized lubricant boiling range hydrocarbons or a liquid fraction thereof.

7. The process of claim 1 wherein said ULO feed contains hydrocarbons boiling below the lubricant boiling range and is heated to a temperature and at a pressure sufficient to vaporize at least a molar majority of the hydrocarbons boiling below the lubricant boiling range and said heating is achieved at least in part by direct contact heating with said superheated vapor to produce a de-volatized ULO liquid fraction which is mixed with additional superheated vapor and charged into said flash or fractionation means.

8. The process of claim 4 wherein said dehydration step comprises pre-heating said ULO feed in a heat exchanger having in-line mixing elements.

9. The process of claim 1 wherein contact of said ULO feed with said superheated vapor occurs in, or immediately upstream of, an in-line mixing means.

10. The process of claim 1 wherein said superheated vapor is heated at least in part in a heat exchanger to produce said superheated vapor.

11. The process of claim 1 wherein said superheated vapor is heated at least in part in a fired heater to produce said superheated vapor.

12. The process of claim 1 wherein said superheated vapor comprises at least a portion of a fluid selected from the group of gas oil, vacuum gas oil, kerosene, jet fuel, heating oil, light cycle oil, heavy cycle oil and mixtures thereof.

13. The process of claim 12 wherein said superheated vapor also comprises at least some lubricant boiling range molecules obtained from said ULO feed.

14. A process for re-refining a used lubricating oil (ULO) containing lubricant boiling range hydrocarbons and a thermally unstable additive package which fouls metal surfaces used to heat said ULO to vaporize said lubricant boiling range hydrocarbons to produce at least two liquid products, a distillate boiling range liquid comprising at least 80 wt % of lubricant boiling range molecules in said ULO and a pumpable liquid residue fraction, said process comprising:
   a. direct contact heating of said ULO with a superheated vapor comprising distillate boiling range hydrocarbons to form a two-phase heated mixture of said ULO and said superheated vapor,
   b. flashing, fractionating or separating said heated mixture to produce a vapor fraction comprising at least a majority by weight of lubricant boiling range hydrocarbons in said ULO feed and a residual liquid fraction comprising at least a majority by weight, of said thermally unstable additives or the decomposition products thereof, said residual liquid fraction containing less than 20%, by weight of said lubricant boiling range hydrocarbons in said ULO feed,
   c. cooling and condensing at least a portion of said vapor fraction to produce a liquid product comprising at least 80 wt % of lubricant boiling range hydrocarbons in said ULO feed.

15. The process of claim 14 wherein at least 90 wt % of lubricant boiling range molecules in said ULO feed are recovered as a liquid product and said residual fraction contains less than 10% by weight of lubricant boiling range molecules in said ULO feed.

16. The process of claim 14 wherein said distillate boiling range hydrocarbons include at least a majority by weight of hydrocarbons selected from the group of gas oil, vacuum gas oil, kerosene, jet fuel, heating oil, light cycle oil, heavy cycle oil and mixtures thereof.

17. A method of making an aliphatic rich feedstock for a catalytic cracking unit from used lubrication oil (ULO) containing lubricant boiling range hydrocarbons and a thermally unstable additive package which fouls metal surfaces used to heat said ULO to vaporize said lubricant boiling range hydrocarbons by heating and vaporizing said ULO by direct contact heating with an aromatic rich superheated vapor to produce a liquid product comprising at least 80 wt % of said lubricant boiling range hydrocarbons in said ULO and a pumpable residual liquid fraction comprising at least a majority by weight of said thermally unstable additives or the decomposition products thereof and containing less than 20% by weight of said lubricant boiling range hydrocarbons in said ULO feed, said process comprising:
   a. direct contact heating of said ULO with a superheated vapor comprising gas oil, vacuum gas oil, FCC light cycle oil, FCC heavy cycle oil, FCC slurry oil to form a two-phase heated mixture of said ULO and said superheated vapor,
   b. flashing, fractionating or separating said heated mixture to produce a vapor fraction comprising at least 80% by weight of lubricant boiling range hydrocarbons in said ULO feed and a pumpable residual liquid fraction comprising at least a majority by weight of said thermally unstable additives or the decomposition products thereof, said residual liquid fraction containing less than 20% by weight of said lubricant boiling range hydrocarbons in said ULO feed,
   c. cooling and condensing at least a portion of said vapor fraction to produce a liquid product comprising at least 80 wt % of lubricant boiling range hydrocarbons in said ULO feed.

18. The process of claim 17 wherein at least 85 wt % of said lubricant boiling range hydrocarbons in said ULO feed are recovered as a liquid product and said pumpable residual fraction contains less than 15 wt % of said lubricant boiling range hydrocarbons in said ULO feed.

19. The process of claim 17 wherein at least 90 wt % of said lubricant boiling range hydrocarbons in said ULO feed are recovered as a liquid product and said pumpable residual fraction contains less than 10 wt % of said lubricant boiling range hydrocarbons in said ULO feed.

20. The process of claim 17 wherein said at least a portion of said aliphatic rich material in said ULO feed is vaporized during contact with said superheated distillate vapor and at least a portion of said aromatic rich superheated vapor is condensed, whereby aliphatic molecules are displaced with high boiling aromatics in said superheated vapor.

* * * * *